United States Patent [19]

Jeong et al.

[11] Patent Number: 5,357,297
[45] Date of Patent: Oct. 18, 1994

[54] CAMERA CAPABLE OF SENSING DEFICIENCY IN LIGHT QUANTITY OF FLASH AND CONTROL METHOD THEREFOR

[75] Inventors: Yong-joon Jeong; Soon-kil Seo, both of Kyeongsangnam, Rep. of Korea

[73] Assignee: Samsung Aerospace Industries, Ltd., Kyeongsangnam, Rep. of Korea

[21] Appl. No.: 107,630

[22] Filed: Aug. 18, 1993

[30] Foreign Application Priority Data

Oct. 23, 1992 [KR] Rep. of Korea ............... 1992-19598

[51] Int. Cl.$^5$ ................. G03B 15/03; G03B 17/38
[52] U.S. Cl. ................. 354/127.1; 354/132; 354/149.11; 354/268
[58] Field of Search .......... 354/132, 149.11, 127.1, 354/127.11, 127.12, 127.13, 268, 423, 409

[56] References Cited

U.S. PATENT DOCUMENTS 4,322,141  3/1982  Tominaga et al. ............ 354/409 X
4,544,254 10/1985  Egawa et al. .............. 354/127.12 X
5,136,312  8/1992  Weaver et al. ................. 354/132
5,202,719  4/1993  Taniguchi et al. ............ 354/132 X Primary Examiner—W. B. Perkey
Attorney, Agent, or Firm—Finnegan, Henderson, Farabow, Garrett & Dunner

[57] ABSTRACT

A camera capable of sensing and indicating insufficient flash illumination which can indicate lack of illumination when an object is far away and in a low brightness condition. A central processing unit CPU of the camera is connected to a switch block including a power switch, a first step release switch, a second step release switch, and a switch for sensing whether an auxiliary flash is mounted. The camera also includes an automatic distance measuring circuit, a brightness measuring circuit, an auxiliary flash, and an alarm. The CPU informs a user that the auxiliary flash should be used when it is determined that a brightness value is lower than a predetermined minimum brightness value and the object is too distant to be sufficiently illuminated.

28 Claims, 2 Drawing Sheets

CAMERA CAPABLE OF SENSING DEFICIENCY IN LIGHT QUANTITY OF FLASH AND CONTROL METHOD THEREFOR

BACKGROUND OF THE INVENTION

1. Field of the Invention

The present invention relates to a photographic apparatus and method for sensing insufficient flash illumination. More particularly, this invention relates to a camera capable of sensing insufficient flash illumination and a control method by which a warning is given when the illumination is insufficient 2. Description of the Related Art Conventionally, an electronic flash (a.k.a. "strobo", hereinafter referred to as "flash") unit is mounted to a camera and used to supplement object illumination when photographs are taken at night or indoors. The flash unit is usually mounted in the camera for middle-sized and small-sized cameras. Flash units may be classified as either manual or automatic. In a manual flash unit system, the flash emits a predetermined amount of illumination regardless of the distance to the object. In an automatic flash system, the amount of flash illumination emitted is controlled depending on the distance between the camera and the object.

Both types of flash systems operate by charging a power source, such as a capacitor, which is triggered to discharge at the time the photograph is taken. A light emitting lamp is usually used to emit an amount of illumination proportional to the charged voltage level of the capacitor. Accordingly, the charged state of the capacitor should provide sufficient discharge voltage to drive the lamp in order to sufficiently illuminate the object.

Conventionally, the following formula (1) is used to determine the proper amount of illumination for a suitable exposure after the distance from the object is determined by an automatic distance measuring circuit incorporated in the camera.

$$\text{flash illumination (a.k.a. ``guide number'') of flash} = \text{brightness (a.k.a. ``}F\text{ number'') of lens} \times \text{distance from an object} \tag{1}$$

Since it is usually difficult to distinguish an object from the background, oftentimes the distance to the object determined by the camera will be for the background instead of the object. When this happens, more illumination is provided than necessary resulting in an overexposed photograph.

Therefore, in the related art, the user can obtain sufficient exposure by increasing the brightness of the lens by reducing the aperture size of a diaphragm. Additionally, a portion of the charge on the capacitor may be shunted from the lamp to reduce illumination or the light emitted from the lamp can be blocked in some manner to reduce the amount of light directed toward the object.

However, since the above-mentioned methods are limited to correcting exposure when the object is close, objects that are more distant would not receive sufficient illumination. For example, if the illumination of the flash (i.e., guide number of the flash) is 12, the maximum brightness (i.e., maximum F number) of the lens is 3.5, and the sensitivity of the film is 100, the maximum limit for sufficient exposure occurs at a distance 3.4 m according to equation (1). Accordingly, if the distance to the object is 7 m, and the maximum brightness of the lens is still 3.5, then the amount of illumination required becomes 24. Thus, it is possible to take a suitably exposed photograph with the same lens setting only if the object illumination is doubled.

When a photograph is taken without recognizing the above-mentioned problems, the amount of light is not sufficient and film is wasted. An example of a technique for disabling the shutter until the flash is sufficiently charged is suggested in Korean Utility Model Publication No. 91-9033, entitled "AN AUTOMATIC CONTROL CIRCUIT FOR A FLASH". Upon detection of a low light signal, the control circuit will wait for a predetermined time for the flash unit to charge before opening the shutter. However, this can be an inconvenience since the shutter operates regardless of the intention of the user. Thus, the user cannot take a photograph at a chosen moment in time.

SUMMARY OF THE INVENTION

Accordingly, the present invention is directed to a camera which substantially obviates one or more of the problems due to limitations and disadvantages of the related art. The present invention is directed to a camera and a camera operating method capable of sensing insufficient illumination available from a built-in flash and alerting the user that a suitably exposed photograph of a distant object can be obtained by using an auxiliary flash.

To achieve this and other advantages in accordance with the purpose of the invention, as embodied and broadly described herein, in a variation, a camera includes a lens having an opening for controlling the amount of light entering into the camera, a main flash for emitting light, a device for measuring a distance from an object to the camera, an auxiliary flash for emitting light, a device for determining whether the distance measured by the distance measuring device is greater than a reference value, and a device for controlling the auxiliary flash based on the result of determination by the determining device.

In another variation, a camera includes a lens having an opening for controlling the amount of light entering into the camera, a flash for emitting light, a device for measuring a distance from an object to the camera, a device for determining whether the distance measured by the distance measuring device is greater than a reference value, and a device for indicating the result of determination by the determining device to the user of the camera.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description, serve to explain the principles of the invention.

DETAILED DESCRIPTION OF THE PREFERRED EMBODIMENT

Figure 1:
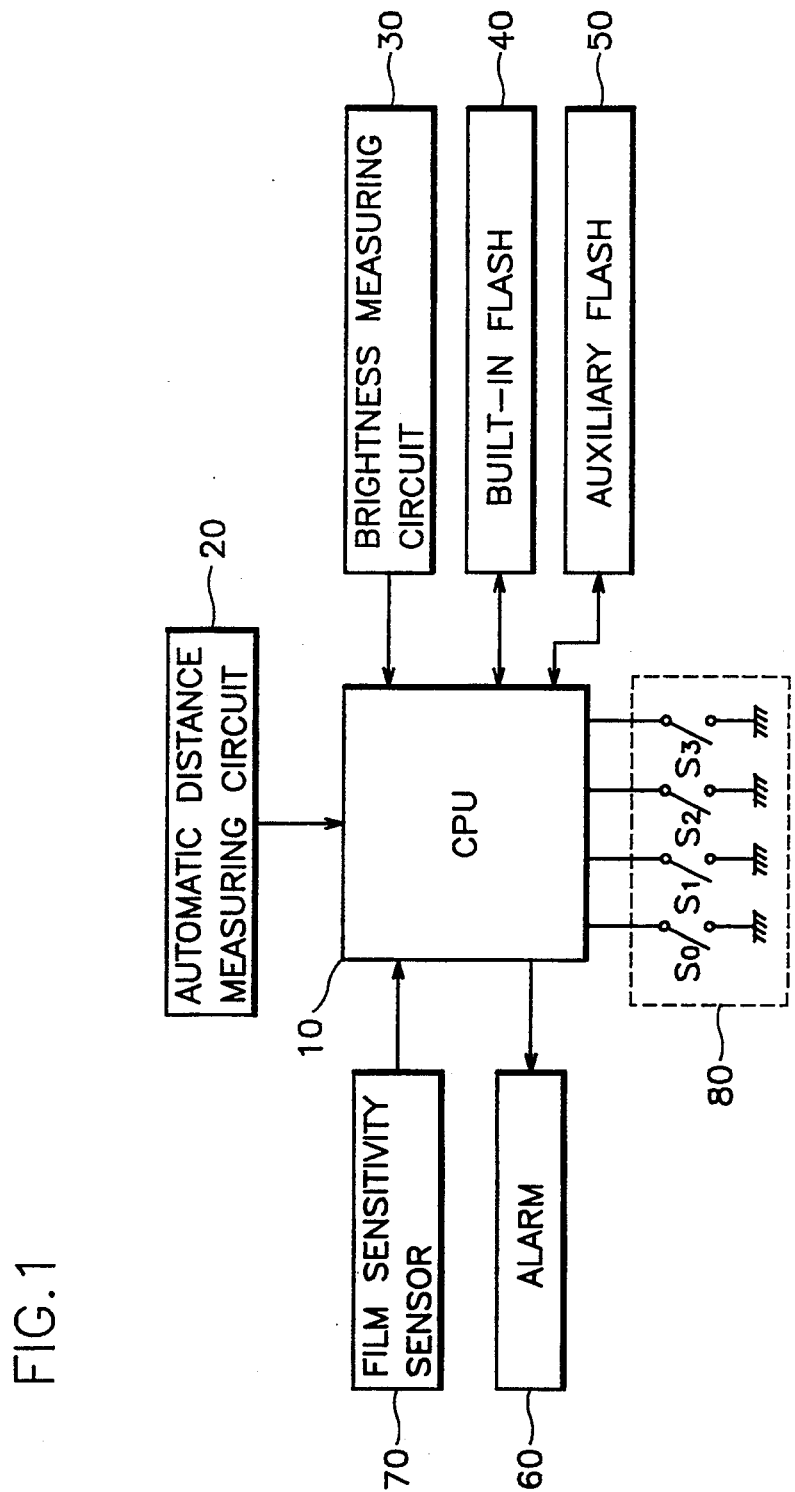
FIG. 1 is a block diagram illustrating one embodiment of the present invention.

Referring to FIG. 1, a camera capable of sensing insufficiency of flash illumination according to one embodiment of the present invention comprises a central processing unit 10, an automatic distance measuring circuit 20 connected to a terminal of the CPU 10, a brightness measuring circuit 30, a built-in flash 40, an auxiliary flash 50, an alarm 60, a film sensitivity sensor 70 and a switch block 80.

Figure 2:
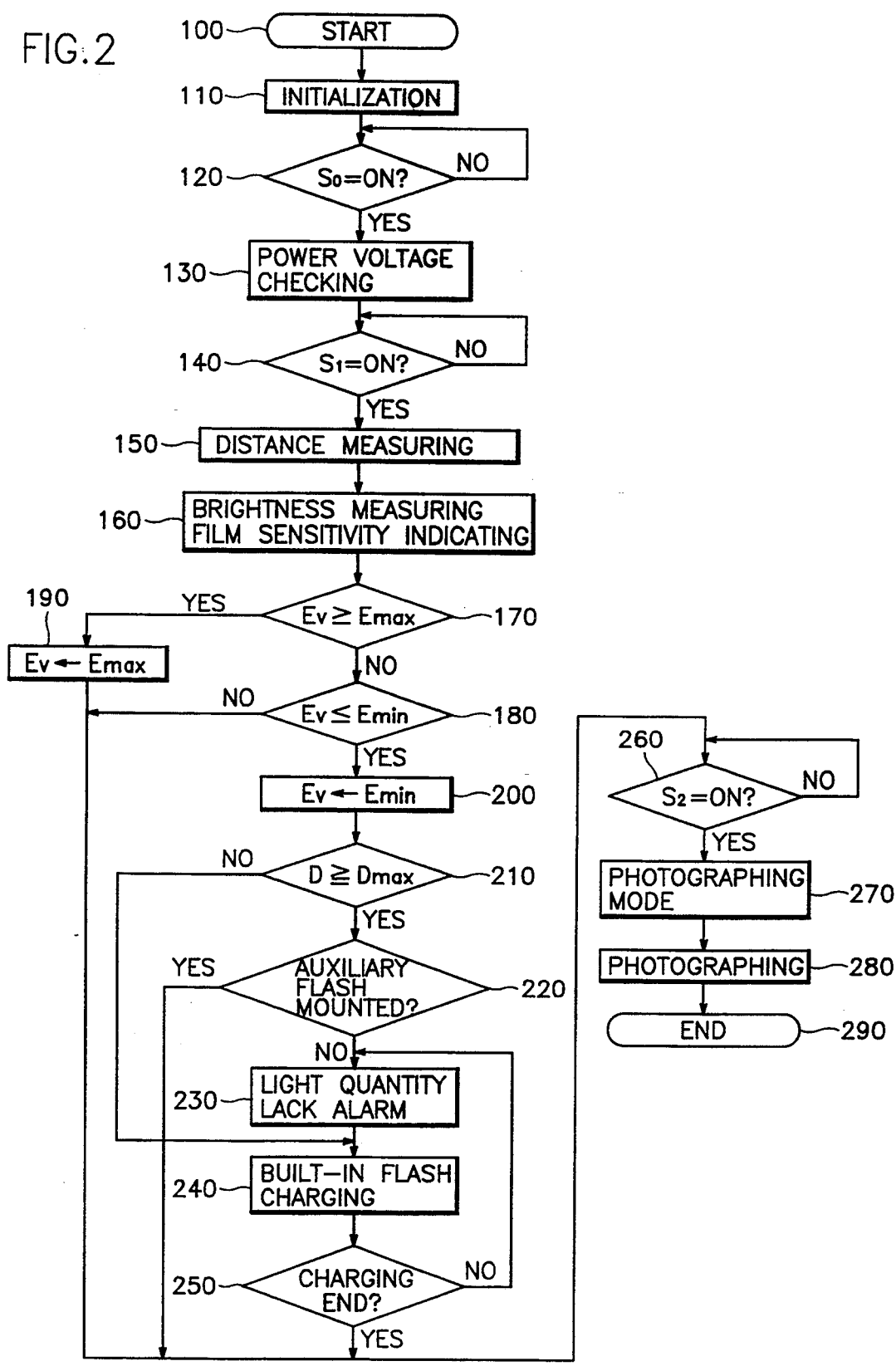
FIG. 2 is a flow chart showing the operational steps preferred by the disclosed embodiment of the present invention.

Referring to FIG. 2, the operation of the camera capable of sensing insufficient flash illumination according to one embodiment of the present invention of the above-mentioned construction, will now be described.

If power is applied to the camera, the CPU 10 initializes each operation (Step 110), and determines whether a power switch $S_0$ in switch block 80 of FIG. 1 is operated (Step 120). If the power switch $S_0$ is turned ON, the CPU 10 checks the voltage of the camera battery (Step 130). In Step 140, the CPU 10 determines whether a first step release switch $S_1$ for taking a photograph is operated.

If the first step release switch $S_1$ is turned ON, the CPU 10 activates the automatic distance measuring circuit 20 to measure the distance to an object (Step 150), and ambient brightness around the object is measured by the brightness measuring circuit 30 (Step 160). In addition, the CPU 10 receives a signal indicating the sensitivity of the film in the camera from the film sensitivity sensor 70. If the first step release switch $S_1$ is turned OFF, the CPU 10 returns to a stand-by mode ready to execute a next operation.

The CPU 10 then determines a maximum photographing distance, Dmax, according to the illumination of the flash and the brightness of lens by the formula (1), wherein Dmax is calculated by dividing the lens brightness by the flash illumination.

The CPU 10 determines if the measured brightness value Ev is greater then a high brightness value Emax determined by the detected sensitivity of the film after the brightness measuring circuit 30 measures the brightness around the object (Step 170). The CPU 10 sets the maximum brightness value Emax as the brightness value Ev to be processed (Step 190) and determines the operation state of a second step release switch $S_2$ (Step 260) when it is determined that the measured brightness value Ev is greater than the maximum brightness value Emax (Step 170). Also, the CPU 10 determines whether the measured brightness value Ev is less than a minimum low brightness value Emin (Step 180) when it is determined in Step 170 that Ev is less than Emax.

The CPU 10 determines whether the second step release switch $S_2$ is operated when the CPU 10 determined in Step 180 that the measured brightness value Ev is greater than the minimum brightness value Emin, and sets the minimum brightness value Emin as the brightness value to be processed when the measured brightness value Ev is smaller than the minimum brightness value Emin (Step 200).

When the measured brightness value Ev is smaller than the minimum brightness value Emin and so becomes the low brightness value, the CPU 10 determines the relation between the distance D from the object measured by the automatic distance measuring circuit 20 and the maximum photographing distance Dmax (Step 210).

The CPU 10 determines in Step 220 whether the auxiliary flash 50 is mounted on the camera since a photograph having a suitable exposure can not be obtained with the light quantity available from the built-in flash 40 when the brightness value is low and the distance D from the object is greater than the maximum photographing distance Dmax (Step 220).

The photograph is taken without operating the alarm 60 when a switch $S_3$ engaged with a hot shoe for mounting the auxiliary flash is turned ON and the auxiliary flash 50 is mounted. The CPU 10 drives the alarm 60, such as a buzzer, to inform the user of the lack of illumination of the flash by sounding or displaying an alarm when the switch $S_3$ is turned OFF and the auxiliary flash 50 is not mounted (Step 230).

The CPU 10 informs the user that the illumination of the flash is lacking and charges the built-in flash 40 (Step 240). The CPU 10 warns the user of the lack of illumination of the flash by the alarm 60, and repeats the above-mentioned Steps 240 and 250 of charging the built-in flash 40 and determining when the built-in flash 40 is fully charged (Step 250). If the above-mentioned steps are carried out and the second step release switch $S_2$ is determined to be turned ON (Step 260), the CPU 10 processes a selected photographing mode (Step 270), a photograph is taken (Step 280) and the process end (Step 290).

As described above, when the user takes a photograph at night using the flash, the user takes the photograph without exactly recognizing whether the illumination of the built-in flash is enough and/or whether the distance from the object exceeds a photographing distance necessary for suitable exposure. Accordingly, the present invention provides a camera and control method capable of sensing insufficient flash illumination in which the user can take a photograph having the suitable exposure by using an auxiliary flash when notified that the illumination of the built-in flash is insufficient because the distance from the object is great and ambient brightness is low.

In addition, the present invention provides a camera and control method capable of sensing insufficient flash illumination having the effect of preventing the waste of film, since the user will choose not to take an underexposed photograph when warned by an alarm.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A camera capable of sensing deficiency in light quantity of flash, comprising:
   lens means having an opening for controlling the amount of light entering into the camera;
   flash means having a guide number for emitting light;
   means for measuring a distance from an object to the camera;
   means for determining whether the distance measured by said distance measuring means is greater than a reference value;
   means for indicating the result of determination by said determining means; and
   auxiliary flash means having a guide number for emitted light, wherein said determining means includes means for determining said reference value based on the guide numbers of said flash means and said auxiliary flash means and the opening of said lens means.

2. The camera of claim 1, wherein said indicating means includes means for producing an audible sound corresponding to the result of determination.

3. The camera of claim 1, wherein said indicating means includes means for producing a visible message corresponding to the result of determination.

4. The camera of claim 1, further comprising means for disabling the operation of the camera based on the result of determination.

5. The camera of claim 1, wherein said determining means includes means for determining said reference value based on the guide number of said flash means and the opening of said lens means.

6. The camera of claim 1, further comprising means for controlling the opening of the lens means based on the guide number of said flash means and the distance measured by the distance measuring means.

7. A camera, comprising:
means for measuring a distance from an object to the camera;
means for measuring ambient brightness around the object;
auxiliary flash means, attachable to the camera, for emitting an auxiliary illumination when measured ambient brightness is low;
control means for producing an alarm signal when the auxiliary flash means is not attached to the camera and the measured ambient brightness is less than a minimum brightness value and a measured distance from the object is greater than a maximum photographing distance;
main flash means for emitting a predetermined illumination in response to the control means when the measured ambient brightness is low and the auxiliary flash means is not attached to the camera; and
alarm means for producing a warning of insufficient flash illumination of the object in response to said alarm signal.

8. The camera of claim 7, further comprising means for sensing the sensitivity of a film.

9. The camera of claim 7, wherein said alarm means includes a buzzer.

10. The camera of claim 7, wherein the control means includes means for determining whether the auxiliary flash means is attached to the camera or not.

11. The camera of claim 7, wherein the control means includes means for energizing the main flash means when the auxiliary flash means is not attached to the camera.

12. The camera of claim 7, wherein the control means includes means for activating the alarm means to indicate that illumination is insufficient when the energizing of the main flash means is not completed.

13. The camera of claim 8, wherein the control means includes means for setting a maximum brightness value associated with a sensed sensitivity of the film and means for comparing the measured ambient brightness to the maximum brightness value.

14. The camera of claim 8, wherein the control means includes means for setting a minimum brightness value associated with a sensed sensitivity of the film and means for comparing the measured ambient brightness to the minimum brightness value.

15. A method for sensing deficiency in light quantity of flash attachable to a camera having a main flash, comprising the steps of:
measuring a distance from an object to the camera;
measuring ambient brightness around the object;
determining whether the measured ambient brightness is high or low;
determining a maximum photographing distance for the camera for sufficient object illumination;
comparing the measured distance from the object to the maximum photographing distance when the measured brightness is determined to be low;
determining whether an auxiliary flash is attached to the camera and activating an alarm to indicate insufficient object illumination, when the measured distance is greater than the maximum photographing distance; and
energizing the main flash when the auxiliary flash is determined not to be attached to the camera.

16. The method of claim 15, wherein the ambient brightness measuring step includes sensing the sensitivity of a film in the camera.

17. The method of claim 15, wherein the main flash energizing step includes sensing an energized state of the main flash.

18. The method of claim 16, further comprising setting a maximum brightness value associated with the sensed sensitivity of the film to determine whether the measured brightness is greater than the maximum brightness value.

19. The method of claim 16, further including setting a minimum brightness value associated with the sensed sensitivity of the film to determine whether the measured brightness is less than the minimum brightness value.

20. The method of claim 17, wherein the main flash energizing step further includes activating the alarm in accordance with the sensed energized state.

21. A camera, comprising:
means for measuring a distance from an object to the camera;
means for measuring ambient brightness around the object;
auxiliary flash means, attachable to the camera, for emitting an auxiliary illumination when measured ambient brightness is less than a minimum brightness value and the measured distance from the object is greater than a maximum photographing distance;
main flash means for emitting a predetermined illumination when the measured ambient brightness is less than a minimum brightness value and the measured distance from the object is less than a maximum photographing distance
control means for producing an alarm signal and a main signal when the measured ambient brightness is less than a minimum brightness value and a measured distance from the object is greater than a maximum photographing distance and said auxiliary flash means is not attached to the camera, wherein the main signal applies to said main flash to emit the predetermined illumination; and
alarm means for producing a warning of insufficient flash illumination of the object in response to said alarm signal.

22. The camera of claim 21, further comprising means for sensing the sensitivity of a film.

23. The camera of claim 21, wherein said alarm means includes a buzzer.

24. The camera of claim 21, wherein the control means includes means for determining whether the auxiliary flash means is attached to the camera or not.

25. The camera of claim 21, wherein the control means includes means for energizing the main flash means when the auxiliary flash means is not attached to the camera.

26. The camera of claim 21, wherein the control means includes means for activating the alarm means to indicate that illumination is insufficient when the energizing of the main flash means is not completed.

27. The camera of claim 22, wherein the control means includes means for setting a maximum brightness value associated with a sensed sensitivity of the film and means for comparing the measured ambient brightness to the maximum brightness value.

28. The camera of claim 22, wherein the control means includes means for setting a minimum brightness value associated with a sensed sensitivity of the film and means for comparing the measured ambient brightness to the minimum brightness value.

* * * * *